United States Patent [19]
Kim

[11] Patent Number: 6,141,308
[45] Date of Patent: Oct. 31, 2000

[54] ZERO CROSSING LEVEL MATCHING APPARATUS AND METHOD

[75] Inventor: Dae Young Kim, Seoul, Rep. of Korea

[73] Assignee: LG Electronics Inc., Seoul, Rep. of Korea

[21] Appl. No.: 09/139,108

[22] Filed: Aug. 25, 1998

[30] Foreign Application Priority Data

Aug. 30, 1997 [KR] Rep. of Korea ........................ 97-45328

[51] Int. Cl.[7] ....................................................... G11B 7/00
[52] U.S. Cl. ........................................ 369/59; 369/124.15
[58] Field of Search ................................. 369/59, 124.15, 369/54, 48, 47, 32, 44.28, 124.14, 124.05

[56] References Cited

U.S. PATENT DOCUMENTS

| | | | |
|---|---|---|---|
| 5,276,664 | 1/1994 | Shikunami | 369/48 |
| 5,490,127 | 2/1996 | Ohta et al. | 369/59 |
| 5,781,521 | 7/1998 | Kim | 369/59 |
| 5,974,088 | 10/1999 | Chang | 369/59 |

*Primary Examiner*—Thang V. Tran

[57] ABSTRACT

A zero crossing level matching apparatus for effectively processing a reproducing signal including two or more components having different zero crossing levels. In the apparatus, a reproducing signal picked up from a recording medium having signal tracks divided into user information fields and identification fields and including first and second signal components having different zero crossing levels in correspondence with the fields is compared with a reference signal by a comparator to detect a data stream. The data stream generated at the comparator is integrated by first and second integrators to detect the zero crossing levels of the first and second signal components. The output signals of the first and second integrators are selectively applied as the reference signal in accordance with whether any one of the first and second signal components is included in the reproducing signal.

18 Claims, 8 Drawing Sheets

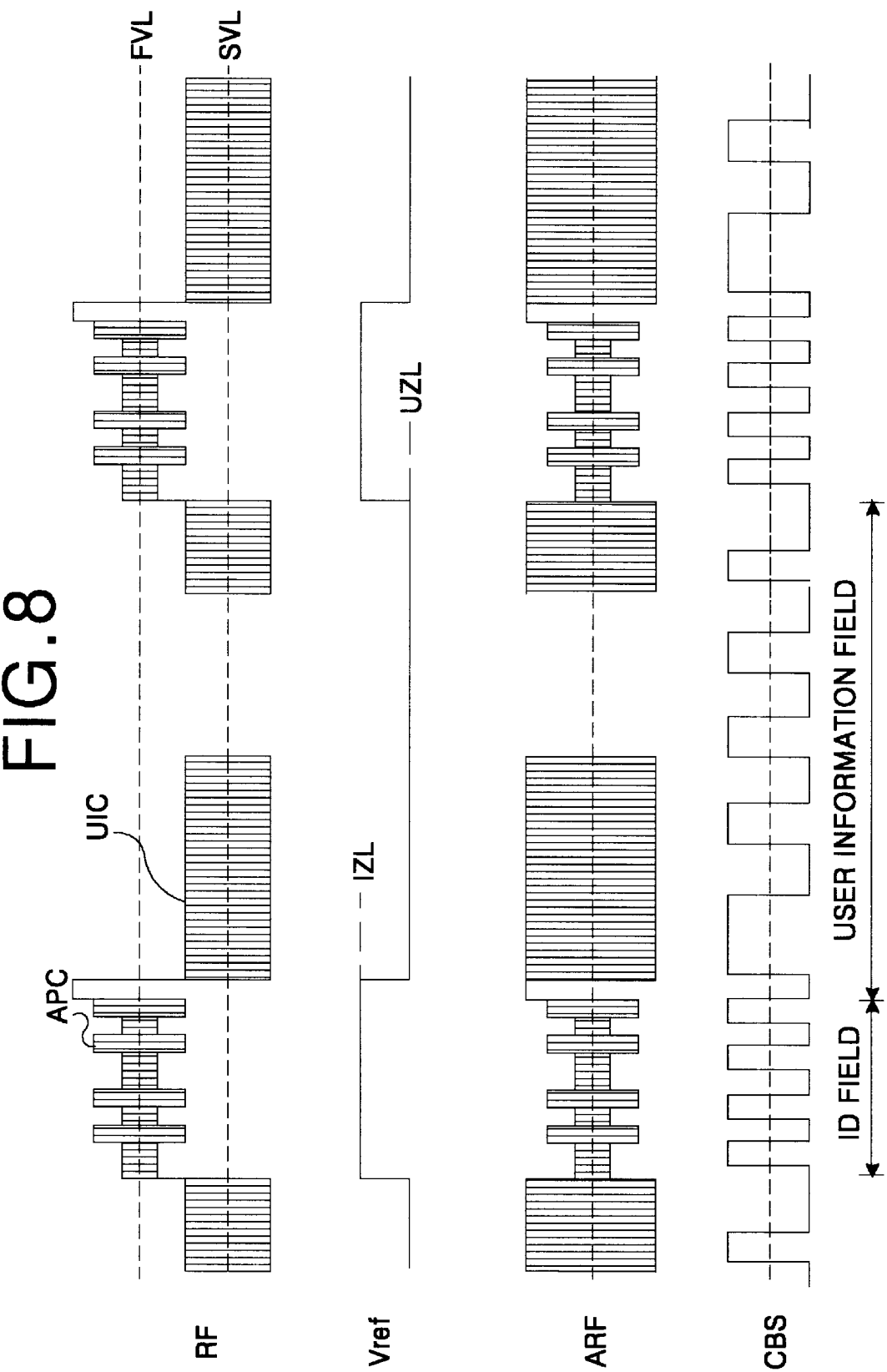

ZERO CROSSING LEVEL MATCHING APPARATUS AND METHOD

BACKGROUND OF THE INVENTION

1. Field of the Invention

This invention relates to an apparatus and method for matching a zero crossing level of a signal reproduced by an information reproducer, and more particularly to a zero crossing level matching apparatus and method that is adapted to process a reproducing signal including two and more components having different zero crossing levels.

2. Description of the Prior Art

Recently, there have been developed and prevalent various types of recording media to record as much information as possible. Examples of such recording media include an optical disc, such as a compact disc(CD) which is relatively large and a digital versatile disc(DVD) which is relatively small, in the width of signal tracks and in the pitch between signal tracks, and so on. In the optical disc, the signal track width and the signal track pitch have been reduced so as to record as much information as possible. Also, in order to reproduce information recorded on the optical disc, a radio frequency signal, hereinafter referred to as "RF signal", read out by means of a pickup must be processed appropriately. In other words, in order to reproduce information on the optical disc, it is necessary to perform a level slicing process for detecting a bit stream (i.e., binaryzation) and a bit stream decoding process including error detection and correction.

Further, the recent recording media include an optical disc in which guiding groove signal tracks are formed to perform tracking easily. In such an optical disc, there exist land signal tracks adjacent to the guiding groove tracks. As shown in FIG. 1, in the optical disc having land and groove signal tracks 2 and 4, embossed pit trains 6 for dividing each of the land and groove signal tracks 2 and 4 into a certain size of unit regions, hereinafter referred to as "sectors", are additionally defined. The embossed pit trains 6 are called "identification code(ID) field" because they indicate the physical position of the signal tracks 2 and 4. On the other hand, the land and groove tracks 2 and 4 divided into sectors by the embossed pit trains 6 are called "recording field" or "user information field" because an information can be recorded thereon by a user. In the disc including the embossed pit trains 6, wobbling signals 8 may be preformatted in each side of the land and groove signal tracks 2 and 4 in such a manner to have the same phase. The wobbling signals 8 are provided by wobbling each side of the land or groove signals track 2 or 4 to have the same phase in accordance with a certain period of carrier signal, as shown in FIG. 2.

As shown in FIG. 3, a conventional information reproducing apparatus for reproducing an information written onto a recording medium, such as CD, DVD and so on, employs an optical pickup 14 to read an information from a recording medium 10 rotated by means of a spindle motor 12. The optical pickup 14 irradiates a light beam onto a land or groove signal track in the recording medium, and converts a light quantity reflected by the signal track into an electrical signal using a photo detector PD. The optical pickup 14 includes a beam splitter BS that allows a light beam from a laser diode LD to be irradiated, via an objective lens OL, onto the land or groove track of the recording medium 10 in a spot shape and allows reflective light received, via the objective lens OL, from the recording medium 10 to be irradiated onto the photo detector PD. The photo detector PD generates electrical signals to be applied to a signal detector 16. The signal detector 16 combines the electrical signals generated at the photo detector PD within the optical pickup 14 to generate a focus error signal Fe, a tracking error signal Te and a radio frequency signal RF. The servo 18 responds to the tracking error signal Te and the focusing error signal Fe from the signal detector 16 and controls a voltage level or a current amount of an actuator driving signal applied to the actuator AC within the optical pickup 14, thereby moving the objective lens OL in the vertical and horizontal direction. Accordingly, a spot-shaped light beam is irradiated onto the land or groove signal track and traces the land or groove signal track. Meanwhile, the channel bit stream detector 20 slices a radio frequency signal RF from the signal detector 16 into a zero crossing level to detect a channel bit stream. To this end, the channel bit stream detector 20 includes a slicer for slicing the radio frequency signal RF into a predetermined voltage level.

When a recording medium shown in FIG. 1 and FIG. 2 is reproduced by means of the conventional information reproducing apparatus, a radio frequency signal RF as shown in FIG. 4, can be generated at the signal detector 16. The radio frequency signal RF includes an embossed pit train or ID component APC having a zero crossing level corresponding to the first voltage level FVL, and a user information component UIC having a zero crossing level corresponding to the second voltage level SVL lower than the first voltage level FVL. This is caused by a fact that the ID field included in the embossed pit train 6 has a light reflectivity higher than the user information field having the land or groove signal track. In other words, when a recording medium of FIG. 1 or FIG. 2 recorded with a user information is reproduced by means of the conventional information reproducing apparatus, a zero crossing level of the radio signal RF generated at the signal detector 16 in the conventional information reproducing apparatus becomes different.

As described above, in order to detect a bit stream for the ID code and a bit stream for the user information from the radio frequency signal having two zero crossing levels, the channel bit stream detector requires two slicing voltage signals having a different voltage level. As a result, the hardware of the channel bit stream detector becomes complex. Also, in the case of performing the digital equalization, the A-D converter has a large response voltage width.

SUMMARY OF THE INVENTION

Accordingly, it is an object of the present invention to provide a zero crossing level matching apparatus and method that is adapted to effectively process a reproduction signal including two and more components having different zero crossing levels.

In order to achieve this and other objects of the invention, a zero crossing level matching apparatus according to one aspect of the present invention includes comparing means for comparing a reproducing signal with a reference signal to detect a data stream, said reproducing signal being picked up from a recording medium and including first and second signal components having different zero crossing levels; first zero crossing level detector for detecting a zero crossing level for the first signal component from the data stream detected by the comparing means; second zero crossing level detector for detecting a zero crossing level for the second signal component from the data stream detected by the comparing means; and switching means for applying any one of output signals of the first and second zero crossing level detectors to the comparing means as a reference signal, depending upon whether any one of the first and second signal components is included in the reproducing signal.

A zero crossing level matching apparatus according to another aspect of the present invention includes reference signal generating means for generating a reference signal having a voltage level changing in accordance with first and second signal components in response to a reproducing signal, said reproducing signal being picked up from a recording medium and including first and second signal components having different zero crossing levels; and level aligning means for allowing the zero crossing levels of the first and second signal components, included in the reproducing signal, to be matched with each other using the reference signal from the reference signal generating means.

A zero crossing level matching method according to still another aspect of the present invention includes the steps of: picking up a reproducing signal including first and second signal components having different zero crossing levels from a recording medium; slicing the picked-up reproducing signal into a reference signal; detecting a first zero crossing level having the first signal component from the sliced reproducing signal; detecting a second zero crossing level having the second signal component from the sliced reproducing signal; and providing any one of the first and second zero crossing levels as the reference signal, depending upon whether any one of the first and second signal components is included in the reproducing signal.

BRIEF DESCRIPTION OF THE DRAWINGS

These and other objects of the invention will be apparent from the following detailed description of the embodiments of the present invention with reference to the accompanying drawings, in which:

FIG. 8 is waveform diagrams of each part of the zero crossing level matching apparatus shown in FIG. 7.

DETAILED DESCRIPTION OF THE PREFERRED EMBODIMENT

Figure 1:
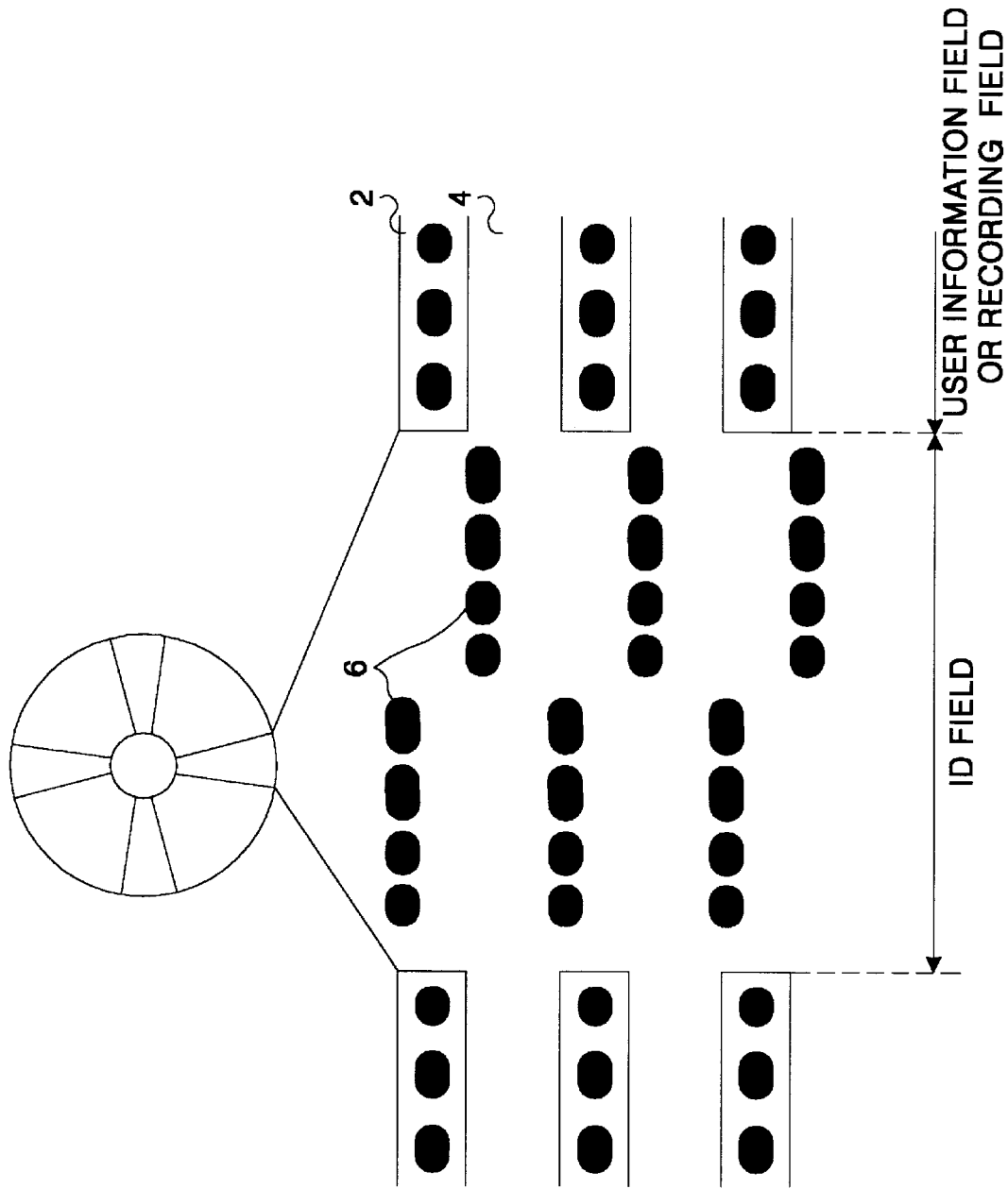
FIG. 1 and FIG. 2 are schematic views showing the structure of a recording medium divided into ID fields and user information fields.
Figure 2:
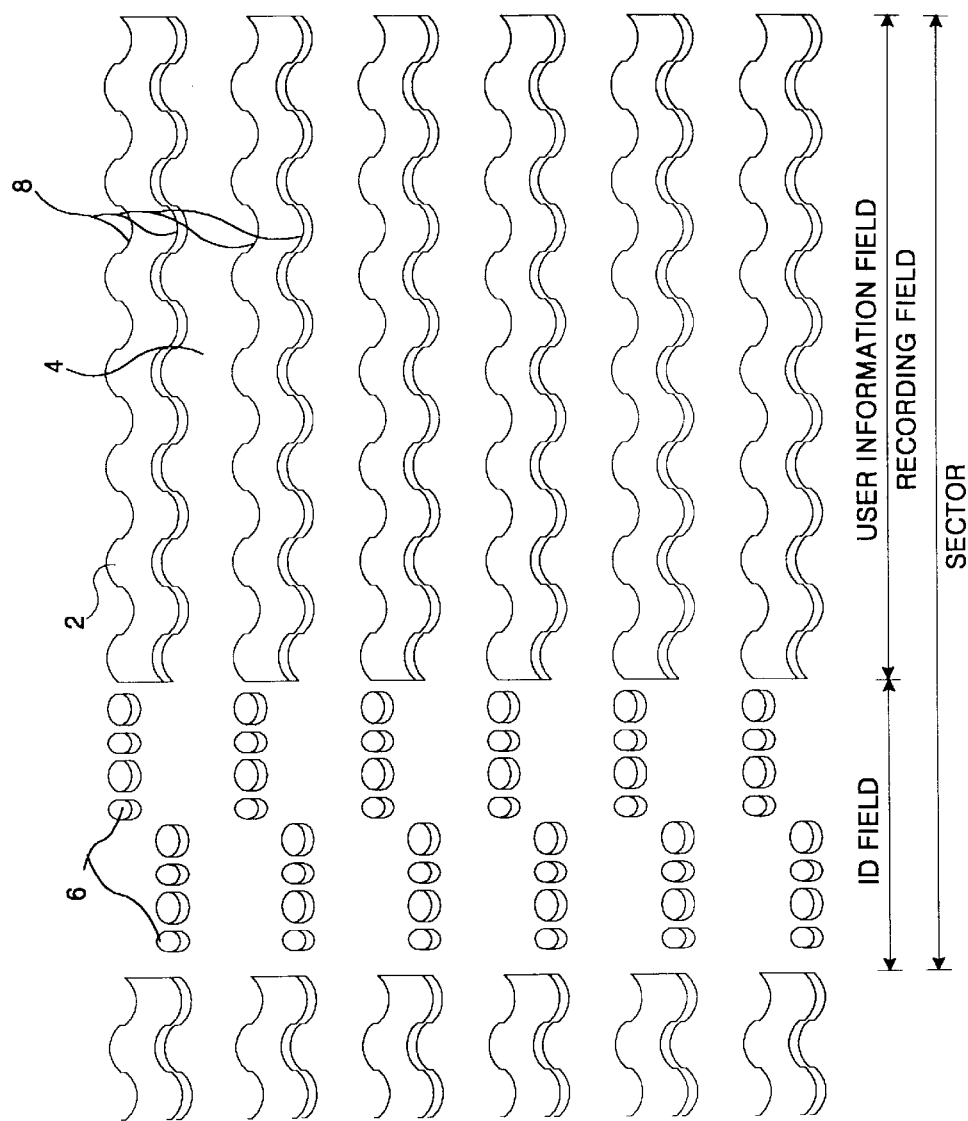
Figure 3:
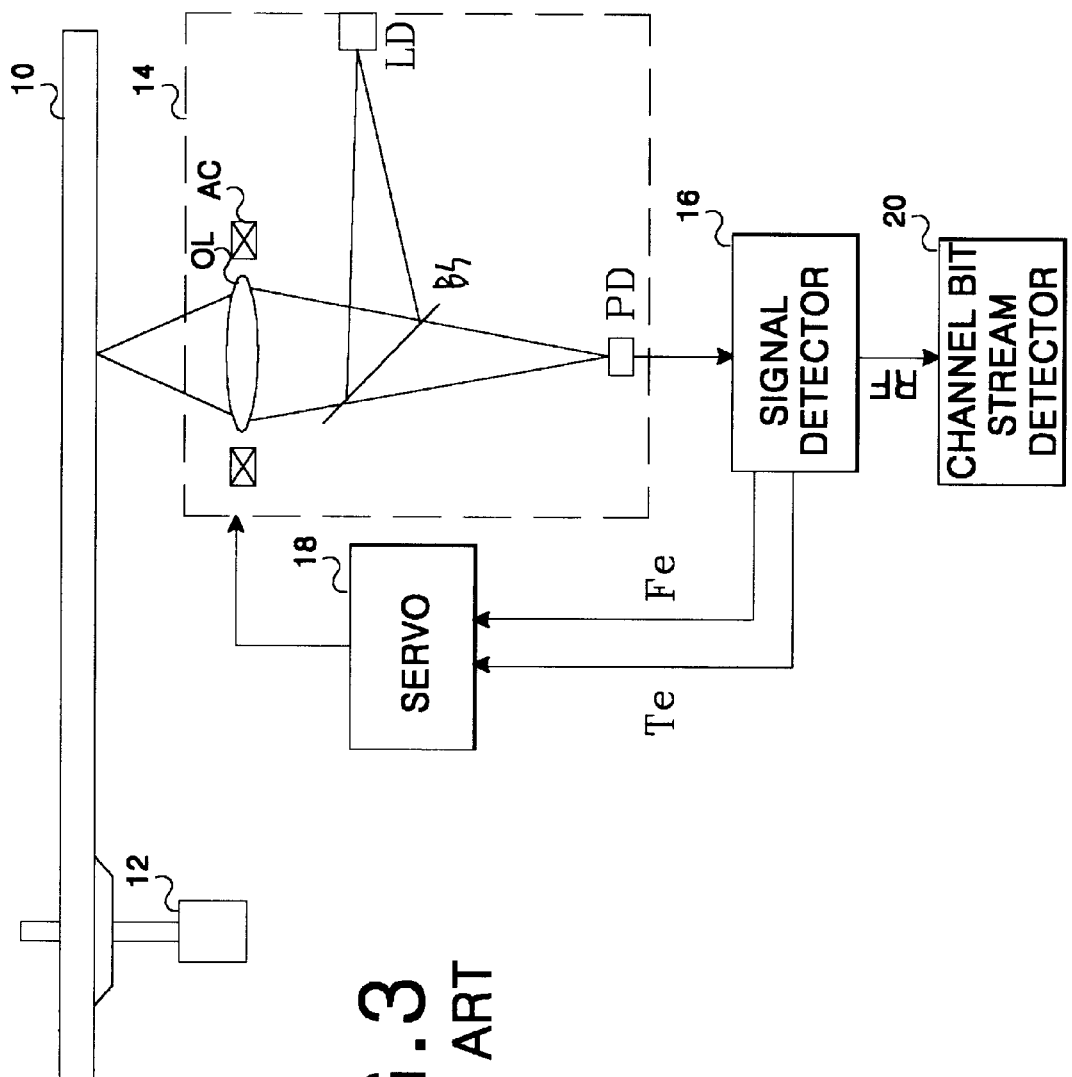
FIG. 3 is a schematic view showing the configuration of a conventional information reproducing apparatus.
Figure 4:
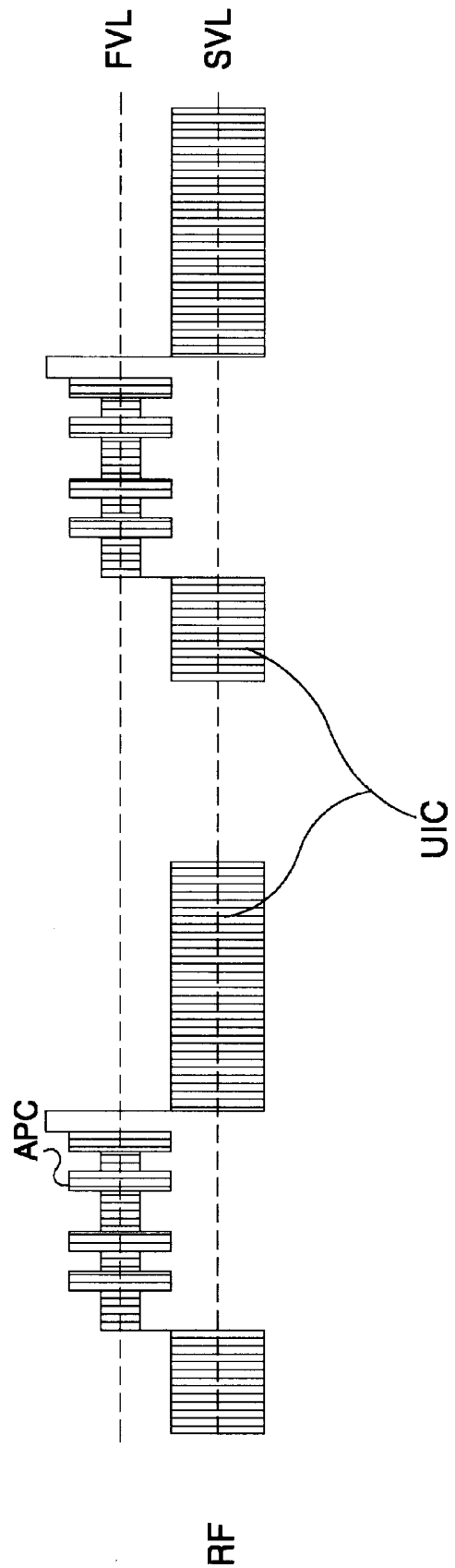
FIG. 4 is waveform diagrams of radio frequency signal picked up from a recording medium shown in FIG. 1 and FIG. 2.
Figure 5:
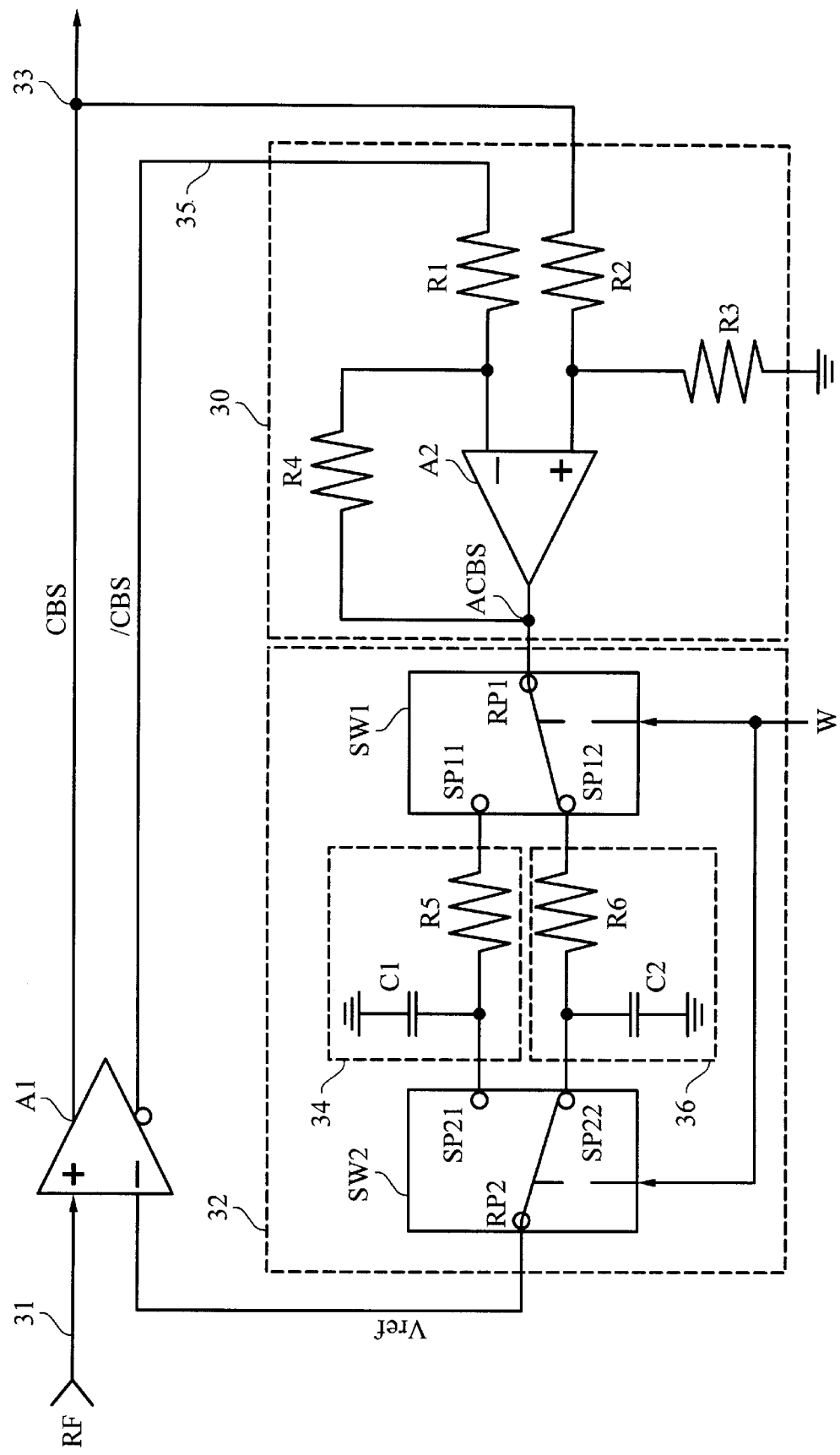
FIG. 5 is a detailed circuit diagram of a zero crossing level matching apparatus according to an embodiment of the present invention.
Figure 6:
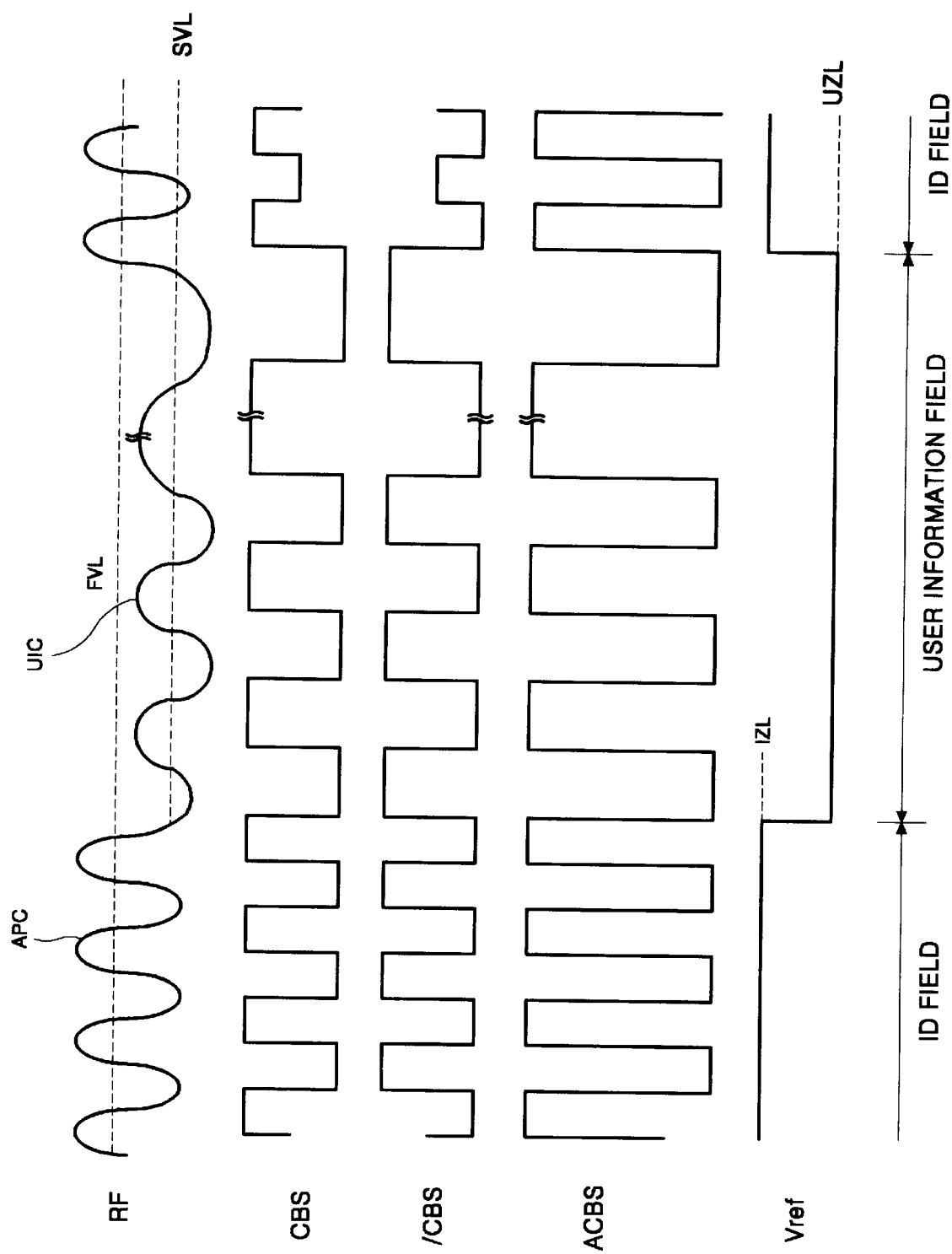
FIG. 6 is waveform diagrams of each part of the zero crossing level matching apparatus shown in FIG. 5.

Referring to FIG. 5, there is shown a zero crossing level matching apparatus according to an embodiment of the present invention. The zero crossing level matching apparatus is used instead of the channel bit stream detector shown in FIG. 3 in an information reproducing apparatus to thereby detect a channel bit stream from a radio frequency signal RF picked up a recording medium of FIG. 1 or FIG. 2. The radio frequency signal includes two components having zero crossing levels different from each other. To this end, the zero crossing level matching apparatus includes a first operational amplifier A1 for receiving at its non-inverting terminal(+) the radio frequency signal RF from an input line 31. When a recording medium in FIG. 1 or FIG. 2 is reproduced, as shown in FIG. 6, the radio frequency signal RF includes an ID component APC having a zero crossing level corresponding to a first voltage level FVL, and a user information component UIC having a zero crossing level corresponding to a second voltage level SVL. The first operational amplifier A1 slices the radio frequency signal RF applied to its non-inverting terminal(+) into a reference voltage Vref applied to its inverting terminal(+) to thereby generate a channel bit stream CBS and an inverted channel bit stream/CBS as shown in FIG. 6. In this case, the ID component APC is sliced into a reference voltage Vref corresponding to the first voltage level FVL; while the user information component UIC is sliced into a reference voltage Vref corresponding to the second voltage level SVL lower than the first voltage level FVL. The channel bit stream CBS is supplied, via the output line 33, to a reproducing information processor. The inverted channel bit stream/CBS is supplied to a feedback line 35.

The zero crossing level matching apparatus further includes a swing width controller 32 for responding to the channel bit stream CBS and the inverted channel bit stream/CBS from the first operational amplifier A1. The swing width controller 32 makes a differential amplification of the channel bit stream CBS and the inverted channel bit stream/CBS to generate a controlled channel bit stream ACBS in which a swing width is maintained constantly. To this end, the swing width controller 32 includes a first resistor R1 connected between an inverting terminal(−) of a second operational amplifier A2 and the feedback line 35, a second resistor R2 connected between a non-inverting terminal(+) of the second operational amplifier A2 and the output line 33, a third resistor R3 connected between the non-inverting terminal(+) of the second operational amplifier A2 and a ground GND, and a fourth resistor R4 connected between the inverting terminal(−) of the second operational amplifier A2 and the output terminal 33. The second operational amplifier A2 makes a differential amplification of the channel bit stream CBS on the output line 33 and the inverted channel bit stream/CBS on the feedback line 35, thereby generating the controlled channel bit stream ACBS as shown in FIG. 6. The swing width of the controlled channel bit stream ACBS have an constant amplitude in the positive and negative polarities.

This is, the controlled channel bit stream ACBS maintains a zero crossing level constantly. As a result, the swing width controller 32 compensates the zero crossing level of the channel bit stream CBS on the output line 33. At this time, the first to fourth resistors R1 to R4 determine a gain of the second operational amplifier A2.

Further, a level matcher 34 which is a principle element of the embodiment of the present invention, is connected with the swing width controller 32. The level matcher 34 includes first and second integrators 34 and 36. In each input terminals of the integrators 34 and 36, first and second controlled switches SW1 and SW2 are arranged. The first and second integrators 34 and 36 are composed of a resistor R5 and R6 and a capacitor C1 and C2. The first and second integrators 34 and 36 detect respectively a zero crossing level of the ID component and a zero crossing level of the user information in accordance with the associated switching operation of the first and second controlled switches SW1 and SW2. The first and second controlled switches SW1 and SW2 are switched by a header window signal W to select the first or second integrator 34 or 36. The header window signal W is generated by means of conventional method. Also, the header window signal W goes to the high logic in the ID field and the low logic in the user information field. If the header window signal W goes to the high logic, i.e. the ID component is input, the first and second controlled switches SW1 and SW2 are respectively contacted with first selective contacts SP11 and SP21 to connect the input terminal of level matcher 32 to the first integrator 34. The first integrator 34 then detects the zero crossing level of the ID component APC. The zero crossing level of the ID component APC is applied to the first operational amplifier A1, as a reference voltage Vref. That is, it is provided with the zero crossing level IZL of the ID component APC. Meanwhile, when the header window signal W goes to the low logic, i.e. the user information component UIC is input, the first and second controlled switches SW1 and SW2 are respectively contacted with second selective contacts SP12 and SP22 to connect the input terminal of the level matcher 32 with the second integrator 36. The zero crossing level UZL of the user information component UIC is detected by the second integrator 36 and applied to the first operational amplifier A1 as the reference voltage Vref. That is, it is provided with the zero crossing level UZL of the user information component UIC. In accordance with alternating the ID and user information components APC and UIC, an integrator 34 or 36 which is not selected by the first and second controlled switches SW1 and SW2, as a first integrator 34 of FIG. 5, holds the zero crossing level detected previously. The zero crossing level held by nonselected integrator is provided to the first operational amplifier A1, as an initial zero crossing level for the next corresponding component.

As described above, the zero crossing level matching apparatus according to an embodiment of the present invention adaptively changes a voltage level of the reference signal Vref used as a slicing level voltage as the ID component APC and the user information component UIS having different zero crossing levels are alternated, so that it can detect a channel bit stream of the ID component APC and a channel bit stream of the user information component UIC accurately. In the embodiment of FIG. 5, the swing width controller 30 is connected to the input terminal of the level matcher 32, but the level matcher 32 can receive the channel bit stream or the inverted channel bit stream from the first operational amplifier A1 directly. In this case, the zero crossing level matching apparatus is equal to the apparatus of FIG. 5 in effect.

Figure 7:
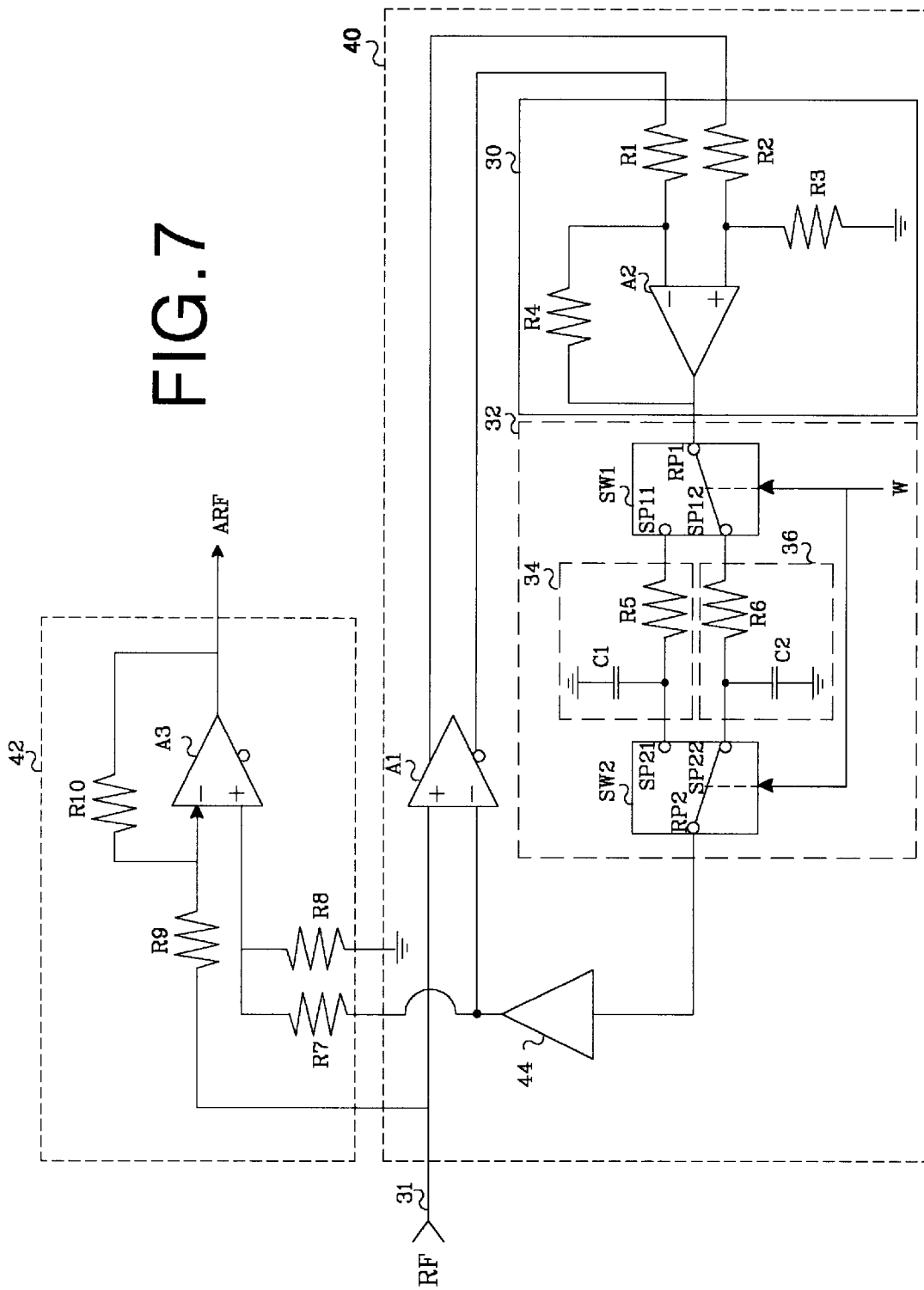
FIG. 7 is a detailed circuit diagram of a zero crossing level matching apparatus according to another embodiment of the present invention.

Referring to FIG. 7, there is shown a zero crossing level matching apparatus according to another embodiment of the present invention. The zero crossing level matching apparatus in FIG. 7 is adapted in the case of performing the digital equalization to decrease the converting voltage range of the analog-digital. To this end, the zero crossing level matching apparatus includes a reference signal generator 40 and a level alignment unit 42 for commonly responding to the radio frequency signal RF from an input line. When a recording medium in FIG. 1 or FIG. 2 recorded with user information is reproduced, as shown in FIG. 8, the radio frequency signal RF includes an ID component APC having a zero crossing level corresponding to a first voltage level FVL, and a user information component UIC having a zero crossing level corresponding to a second voltage level SVL.

The first signal generator 40 generates a reference signal Vref, as shown in FIG. 8, having a voltage level changing adaptively as the ID component APC and the user information component UIC having different zero crossing levels are alternated. To this end, the reference voltage generator 40 is configured in similarity to the zero crossing level matching apparatus shown in FIG. 5. The reference voltage 40, however, is the same as the zero crossing level matching apparatus in FIG. 5 except that it further includes a buffer 44 connected between an inverting terminal(−) of a first operational amplifier A1 and a reference contact RP2 of a second control switch SW2. The buffer 44 buffers a reference signal Vref as shown in FIG. 8 received from the reference contact RP2 of the second control switch SW2 and applies the buffered reference signal Vref to the inverting terminal(−) of a first operational amplifier A1 and the level alignment unit 42.

Meanwhile, the level alignment unit 42 makes a differential amplification of the radio frequency signal RF from an input line 31 and the reference signal Vref from the buffer 44, thereby generating an aligned radio frequency signal ARF, shown in FIG. 8, in which a zero crossing level FVL of the ID component APC is equal to a zero crossing level SVL of the user information component UIC. To this end, the level alignment unit 42 includes a seventh resistor R7 connected between the inverting terminal(−) of a third operational amplifier A3 and the input line 31, an eighth resistor R8 connected between the non-inverting terminal(+) of the third operational amplifier A3 and the output terminal of the buffer 44, a ninth resistor R9 connected between the non-inverting terminal(+) of the third operational amplifier A3 and a ground GND, and a tenth resistor R10 connected between the inverting terminal(−) of the third operational amplifier A# and the output terminal thereof. The third operational amplifier A3 makes a differential amplification of the radio frequency signal RF at the input line 31 and the reference signal Vref from the output terminal of the buffer 44, thereby generating the aligned radio frequency signal ARF, as shown in FIG. 8, in which the zero crossing level of the ID component APC and the zero crossing level of the user information component UIC is maintained equally. At this time, the seventh to tenth resistors determine a gain of the third operational amplifier A3. The aligned radio frequency signal ARF, in which the zero crossing level of the ID component APC is matched with that of the user information component UIC, is applied to the A-D converter for digital-equalizing. Then, it is provided with a channel bit stream CBS as shown in FIG. 8 by the digital equalizing process.

As described above, in the zero crossing level matching apparatus according to the present invention, a voltage level of the reference signal Vref used as a slicing level voltage is alternately changed as the ID component APC and the user information component UIC, having different crossing levels, included in the radio frequency signal RF are alternated, thereby detecting the channel bit stream of the ID component APC and the user information component UIC accurately. The zero crossing level matching apparatus according to the present invention is capable of simplifying the circuit configuration of the channel bit stream detector.

Further, in the zero crossing level matching apparatus, the ID component APC and the user information component UIC, having different zero crossing levels, included in the radio frequency signal RF are differentially amplified with the reference signal Vref having a varying voltage level and aligned to have the same zero crossing level. The radio frequency signal aligned in this manner is applied to the channel bit stream detector including the A-D converter and the digital equalizer, so that a response voltage width of the A-D converter can be reduced. Although the present invention has been explained by the embodiment shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A zero crossing level matching apparatus, comprising:
    comparing means for comparing a reproducing signal with a reference signal to detect a data stream, said reproducing signal being picked up from a recording medium and including first and second signal components having different zero crossing levels;
    first zero crossing level detector for detecting a zero crossing level for the first signal component from the data stream detected by the comparing means;
    second zero crossing level detector for detecting a zero crossing level for the second signal component from the data stream detected by the comparing means; and
    switching means for applying any one of output signals of the first and second zero crossing level detectors to the comparing means as the reference signal, depending upon whether any one of the first and second signal components is included in the reproducing signal.

2. The zero crossing level matching apparatus as claimed in claim 1, wherein said switching means is responsive to a header window control signal indicating whether any one of the first and second signal components is picked up to alternately connect the first and second zero crossing level detectors to the comparing means.

3. The zero crossing level matching apparatus as claimed in claim 2, wherein said first signal component includes an user information recorded on the recording medium and said second signal component includes an identified information preformatted on the recording medium.

4. The zero crossing level matching apparatus as claimed in claim 1, wherein said switching means includes:
    a first control switch for selectively applying the output signal of the comparing means to input terminals of the first and second zero crossing level detectors; and
    a second control switch for selectively delivering the output signals of the first and second zero crossing level detectors to the comparing means.

5. The zero crossing level matching apparatus as claimed in claim 4, further comprising:
    swing width control means, connected between the first control switch and the comparing means, for maintaining a swing width of the output signal of the comparing means constantly.

6. The zero crossing level matching apparatus as claimed in claim 5, wherein said first and second zero crossing level detectors include a integrator.

7. The zero crossing level matching apparatus as claimed in claim 5, wherein said first and second zero crossing level detectors perform a voltage integration operation and a voltage hold operation alternately as they are switched by means of the switching means.

8. A zero crossing level matching apparatus, comprising:
    reference signal generating means for generating a reference signal having a voltage level changing in accordance first and second signal components in response to a reproducing signal, said reproducing signal being picked up from a recording medium and including first and second signal components having different zero crossing levels; and
    level aligning means for allowing the zero crossing levels of the first and second signal components included in the reproducing signal to be matched with each other using the reference signal from the reference signal generating means.

9. The zero crossing level matching apparatus as claimed in claim 8, wherein said reference signal generating means includes:
    a comparing means for comparing the reproducing signal with the reference signal;
    first zero crossing level detector for detecting the zero crossing level of the first signal component from the output signal of the comparing means;
    second zero crossing level detector for detecting the zero crossing level of the second signal component from the output signal of the comparing means; and
    switching means for providing any one of output signals of the first and second zero crossing level detectors as the reference signal, depending upon whether any one of the first and second signal components is included in the reproducing signal.

10. The zero crossing level matching apparatus as claimed in claim 9, wherein said first and second zero crossing level detectors include a integrator.

11. The zero crossing level matching apparatus as claimed in claim 8, wherein said first signal component includes an user information recorded on the recording medium and said second signal component includes an identified information preformatted on the recording medium.

12. The zero crossing level matching apparatus as claimed in claim 9, wherein said switching means is responsive to a header window control signal indicating whether any one of the first and second signal components is picked up to alternately connect the first and second zero crossing level detectors to the comparing means.

13. The zero crossing level matching apparatus as claimed in claim 9, wherein said switching means includes:
    a first control switch for selectively applying the output signal of the comparing means to input terminals of the first and second integrating means; and
    a second control switch for selectively delivering the output signals of the first and second zero crossing level detectors to the level aligning means.

14. The zero crossing level matching apparatus as claimed in claim 13, further comprising:
    swing width control means, connected between the first control switch and the comparing means, for maintaining a swing width of the output signal of the comparing means constantly.

15. The zero crossing level matching apparatus as claimed in claim 9, wherein said first and second zero crossing level detectors perform a voltage integration operation and a voltage hold operation alternately as they are switched by means of the switching means.

16. A zero crossing level matching method, comprising the steps of:
    picking up a reproducing signal including first and second signal components having different zero crossing levels from a recording medium;
    slicing the picked-up reproducing signal into a reference signal;
    detecting a first zero crossing level having the first signal component from the sliced reproducing signal;
    detecting a second zero crossing level having the second signal component from the sliced reproducing signal; and providing any one of the first and second zero crossing levels as the reference signal, depending upon whether any one of the first and second signal components is included in the reproducing signal.

17. The zero crossing level matching method as claimed in claim 16, wherein said first signal component includes an user information recorded on the recording medium and said second signal component includes an identified information preformatted on the recording medium.

18. The zero crossing level matching method as claimed in claim 16, further comprises a step of being equivalent the zero crossing levels of the first and second signal components included in the reproducing signal.

* * * * *